United States Patent
Vincent et al.

(10) Patent No.: US 11,470,497 B2
(45) Date of Patent: Oct. 11, 2022

(54) SERVICE RECORDING IN A LOCAL AREA NETWORK

(71) Applicant: Orange, Paris (FR)

(72) Inventors: Yoann Vincent, Cachan (FR); Dimitri Bricheteau, Rennes (FR); Louis-Xavier Carbonnel, Pace (FR)

(73) Assignee: ORANGE, Issy-les-Moulineaux (FR)

( * ) Notice: Subject to any disclaimer, the term of this patent is extended or adjusted under 35 U.S.C. 154(b) by 602 days.

(21) Appl. No.: 16/088,039

(22) PCT Filed: Mar. 23, 2017

(86) PCT No.: PCT/FR2017/050682
§ 371 (c)(1),
(2) Date: Aug. 17, 2020

(87) PCT Pub. No.: WO2017/162989
PCT Pub. Date: Sep. 28, 2017

(65) Prior Publication Data
US 2021/0084520 A1 Mar. 18, 2021

(30) Foreign Application Priority Data
Mar. 25, 2016 (FR) .................................. 1652631

(51) Int. Cl.
*H04W 4/00* (2018.01)
*H04W 28/02* (2009.01)
*H04W 4/80* (2018.01)
*H04L 12/28* (2006.01)
*H04L 41/12* (2022.01)
*H04L 67/1061* (2022.01)
*H04W 28/18* (2009.01)

(52) U.S. Cl.
CPC ..... *H04W 28/0215* (2013.01); *H04L 12/2809* (2013.01); *H04L 41/12* (2013.01); *H04L 67/1061* (2013.01); *H04W 4/80* (2018.02); *H04W 28/18* (2013.01)

(58) Field of Classification Search
None
See application file for complete search history.

(56) References Cited

U.S. PATENT DOCUMENTS

2015/0189505 A1* 7/2015 Marien ............... H04L 63/0428
380/270
2015/0236913 A1* 8/2015 Nakano .................. H04L 67/10
709/223

OTHER PUBLICATIONS

International Search Report and Written Opinion dated May 23, 2017 for Application No. PCT/FR2017/050682.
(Continued)

*Primary Examiner* — Zewdu A Beyen
(74) *Attorney, Agent, or Firm* — Knobbe, Martens, Olson & Bear, LLP

(57) ABSTRACT

A method and device for recording a service in a local network are described. The service includes a set of actions to be carried out on at least one terminal of the network to provide a part of the service. The method includes obtaining a unique identifier, finding capacities of the network terminals, acquiring the found terminal capacities, constructing the service as a sequence of actions on at least one found terminal via a user interface, associating the service with the unique identifier, and recording the service and the associated unique identifier.

11 Claims, 2 Drawing Sheets

(56) References Cited

OTHER PUBLICATIONS

Figure 1:
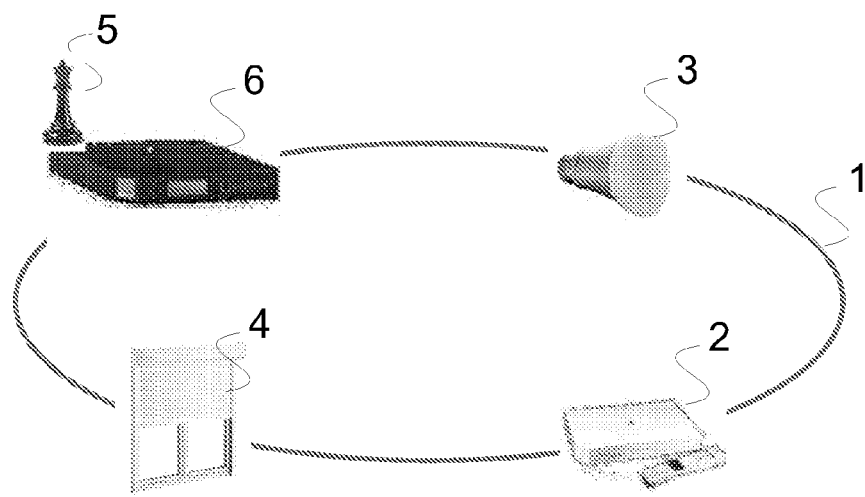

Rietzler et al., "homeBLOX", Proceedings of the 2013 ACM Conference on Pervasive and Ubiquitous Computing Adjunct Publication, UBICOMP '13, Zurich, Switzerland, Jan. 1, 2013, pp. 801-808.

Thomas et al., "Thingies for Dummies: A smart home infrastructure for the rest of us", Jan. 1, 2012, Retrieved from the Internet: URL: http://www.itu.dk/-tped/teaching/pervasive/SPCL-E2012/example_reports/group05_F2012_thingiesfordummies.pdf.

* cited by examiner

SERVICE RECORDING IN A LOCAL AREA NETWORK

RELATED APPLICATIONS

This application is the U.S. National Phase of Application No. PCT/FR2017/050682 entitled "SERVICE RECORDING IN A LOCAL AREA NETWORK" and filed Mar. 23, 2017, which claims the benefit of French Patent Application No. 1652631, filed Mar. 25, 2016, each of which is incorporated by reference in its entirety.

TECHNICAL FIELD

Technical Field

The invention relates to the field of telecommunications, and more particularly to a local area communications network.

Generally, the invention applies to the devices of such a network.

PRIOR ART

A home network is a computer network that links together, with or without wires, the terminal devices, or more simply terminals, of a household (computers, printer peripherals, storage peripherals, home automation peripherals, etc.) that are able to communicate together. A home network includes a router device, also commonly called a gateway, which is an intermediate element that redirects or routes data packets between the various terminals and networks that are connected thereto.

In the context of a home network, a user has the option of executing a given service on a given terminal having its own features (for example, view the user's digital photographs on a television or on a digital tablet, control a home automation device, etc.). Such a service may be seen as a set of software components, or programs, which are associated with a set of hardware components.

In some cases, it is desirable to execute such a service on a plurality of terminal devices (tablet, smartphone, TV, PC, lights, radiators, etc.) of one and the same user, in an ordered sequence of basic actions: for example, a user may wish to view a film on his television and, to this end, close a roller shutter (blind) beforehand and turn on a light in order to benefit from optimum lighting conditions.

The user may execute these actions manually, but this operation is burdensome, in particular when the same service has to be executed several times.

In the home automation field, there are solutions for selecting a simple scenario from a remote controller or a smartphone. However, this type of scenario involves only home automation terminals of connected object type (sensors, lights, etc.) of which the user has prior knowledge since he has installed these objects in the local area network himself.

However, in this context, the user himself has to know the various terminals of his network and the various actions that it is possible to perform on the various terminals in order to define his service.

At the present time, there is therefore not a solution for the simple and automatic construction, in a local area network, of a scenario relating to all of the terminals of the network.

The invention offers a solution that does not have the drawbacks of the prior art.

THE INVENTION

According to one functional aspect, the invention relates to a method for recording a service in a local area network, said service consisting of a set of actions to be performed on at least one terminal of the network that is able to provide part of the service, said method including the following steps:
  Initial procurement of a unique identifier;
  Discovering the capabilities of the terminals of the network;
  Acquiring the capabilities of the discovered terminals;
  Constructing the service in the form of a sequence of actions on at least one discovered terminal, by way of user interface means;
  Associating the service with said unique identifier;
  Recording the service and the associated unique identifier.

Advantageously according to this approach, a service is able to be recorded in association with a unique identifier, so as subsequently to be implemented in a very simple manner, regardless of the complexity of the service and the number of terminals involved. A preliminary discovery step makes it possible to present the user with the terminals available in his network and the various services that he is able to execute using these terminals. The user does not necessarily have prior knowledge of these terminals. Furthermore, these terminals may be "inaccessible" at the time of the discovery (for example turned off).

"Service" is understood in this case to mean a set of actions to be performed on at least one terminal of the network that is able to provide part of the service.

"Part of the service" is understood in this case to mean an action contributing to the service, executed on a single terminal, in particular a physical action (turn off the light, turn on the television, lower a blind, lower the brightness of a light, launch decoding of a film, etc.) or software (modify a variable, send a message, etc.).

"Discovery" is understood to mean an operation well known to a person skilled in the art that is able to be implemented in the form of a request compliant with a local area network protocol, for example the UPnP standard, or the BLE (Bluetooth Low Energy) standard. The aim of the UPnP standard is to allow terminals to easily connect and to communicate in a simple manner within a local area network. It constitutes a set of communication protocols based on the IP protocol and enacted by the UPnP standardization forum ("UPnP Forum"). To control the terminals of the network, UPnP uses control points that conventionally transmit what are called discovery messages (MSEARCH) to the various terminals of the network in order to recover, in return, a description of the terminals corresponding to the request. These discovery messages are more often than not transmitted in point-to-multipoint communication mode, also called multicast mode, from the control point to the terminals. A terminal device compatible with the UPnP standard responds to these request messages by supplying its features (terminal type, hardware and software capabilities, etc.). The BLE standard, which is a wireless transmission technique available in the form of an open standard and whose aim is to supply reduced power in comparison with standard applications of the Bluetooth standard, also provides a terminal discovery mechanism. The BLE terminals that are intended to be discovered (called "peripherals" in BLE) periodically transmit, in point-to-multipoint mode, messages on channels defined by the BLE standard. These messages, called "advertisements" or else "beacons", contain, inter alia, the description of the terminal and the services that it provides. These services are referenced in the "advertisements" by UUIDs (universally unique identifiers). Thus, by listening on the channels dedicated to BLE "advertisements", and then by interpreting the messages received (whose format is standardized), a device of the home automation network (for example the service gateway) will be able to discover the available BLE terminals and the associated services. Any other protocol that authorizes discovery may be contemplated (Zigwave, etc.).

"Constructing the service" is understood to mean the establishment of a list of actions to be performed on at least one of the terminals of the network. These actions may or may not follow a time sequence. In the example already cited, the construction of the service is equivalent to entering (for example via a graphical interface) the sequence of the following basic actions, sequentially or non-sequentially:

lower the blind (action on the blind);
turn on the light (action on the light);
turn on the digital decoder and the television (action on the digital decoder and the television);
launch playback of an item of audiovisual content on the television (action on the digital decoder).

"Associating the service with a unique identifier" is understood to mean the establishment of a relationship between the service (in the form of a list of basic actions) and an identifier, which may for example be a string of letters, of numbers, an image, a digital key, a sound, etc. or any other identifier, as long as it is able to be distinguished from the other potential identifiers. It will be noted that an identifier is not associated with a user, but rather with a service or with a set of sub-services of one and the same service (as will be detailed hereinafter, the identifier may specifically trigger a first sub-service when used for a first time, and then a second sub-service when used for a second time, etc., the second sub-service being linked to the first one).

"Recording the service and its identifier" is understood to mean storing the service (in the form of a list of basic actions) and its associated identifier in a memory, for example of one of the terminals of the local area network, of the service gateway, or of a device outside the local area network (in the cloud), etc.

Advantageously, if the unique identifier is procured before the construction of the service, the method according to the invention may automatically invite the user to configure the associated service, for example via a human-machine interface situated on any one of the terminals linked to the network, such that the user is subsequently able to reuse this known identifier in order to implement the service. However, it is also possible to contemplate the user initially configuring the service and then procuring the identifier to be associated therewith.

According to one particular mode of implementation of the invention, a method such as described above is furthermore characterized in that the step of acquiring the unique identifier is followed by a step of testing the association of said identifier with a service, and in that the steps of constructing, associating and recording the service are performed only if the identifier is not already associated with a service.

Advantageously according to this mode, the service is constructed and recorded only the first time that the unique identifier is provided to the system implementing the method.

According to a second particular mode of implementation of the invention, which may be implemented as an alternative or in addition to the previous one, a method such as described above is furthermore characterized in that the unique identifier is procured by reading of a contactless tag.

This mode of implementation of the invention allows the user very easily to use a contactless NFC (near field communication) or more broadly RFID (for radiofrequency identification) tag or "token" to trigger recording of his service. A contactless tag reader may be positioned for example on the terminal that records the service (any terminal of the network, dedicated terminal, service gateway, etc.).

An "NFC tag" is an electronic tag equipped with contactless NFC technology. Each tag has a unique identifier (UID) in the form of several bytes of data. The tag may or may not be rewritable.

According to a third particular mode of implementation of the invention, which may be implemented as an alternative or in addition to the previous ones, said method includes the following steps:

Procuring, subsequent to the first procurement, a unique identifier of the service;
Procuring the data of the service from the unique identifier;
Implementing the service on at least one terminal of the local area network.

Advantageously according to this mode, a new procurement of an identifier that has already been recorded, upon a first procurement, in association with a service triggers the implementation of this service.

According to one variant of this particular mode of implementation of the invention, a method such as described above is characterized in that the procurement, subsequent to the first procurement, of the identifier is achieved by reading of a contactless tag.

Advantageously according to this mode, the unique identifier that was recorded upon a first presentation of an NFC tag is reused in a very simple manner to implement the service, by simply presenting the tag to the system implementing the method. A contactless tag reader may be positioned for example on a terminal of the network, the service gateway, etc.

According to a fourth particular mode of implementation of the invention, which may be implemented as an alternative or in addition to the previous ones, a method such as described above is furthermore characterized in that the service is associated with a set of sub-services, each sub-service being identified by a sub-service number in the set of sub-services, and in that a new procurement, following the first one, of the unique identifier of the service triggers the implementation of a sub-service identified by a sub-service number.

Advantageously according to this mode, the service is associated with a set of sub-services that may have variants of the same service, which may be for example a variation of one of the parameters on one of the devices (increasing/decreasing brightness of the light upon each presentation of the identifier, change of multimedia content, etc.). Each acquisition of the identifier triggers a new sub-service in the set of sub-services associated with the service, and therefore with the identifier.

According to one variant of this embodiment of the invention, an implementation method such as described above is furthermore characterized in that the last sub-service associated with the service resets the terminals of the network to the state in which they were before the first sub-service was triggered.

Advantageously according to this mode, the last procurement of the identifier, implementing the last sub-service in the set of sub-services, makes it possible to reset the devices of the network to the state in which they were before the service was implemented. For example, a device that was turned on/powered up when the service was implemented may be turned off by implementing the last sub-service.

According to a fifth particular mode of implementation of the invention, which may be implemented as an alternative or in addition to the previous ones, a method such as described above is furthermore characterized in that the discovery step is followed by a step of automatic acquisition of software components necessary to enable an action on a discovered terminal.

Advantageously according to this mode, if a discovered terminal is not yet known to the device that will subsequently be responsible for implementing the service (typically the service gateway), communication software components (plugins) are automatically downloaded. It will thus be possible, when the service is effectively implemented, to be able to dialog with terminal devices whose interfaces were not yet known.

According to one hardware aspect, the invention also relates to a device for recording a service in a local area network, said service consisting of a set of actions to be performed on at least one terminal of the network able to provide part of the service, said device including:
- a module for procuring a unique identifier;
- a module for discovering the capabilities of the terminals of the network;
- a module for acquiring the capabilities of the discovered terminals;
- a user interface means module;
- a module for constructing the service in the form of a sequence of actions on at least one discovered terminal, by way of the user interface means;
- a module for associating the service with said unique identifier;
- a module for recording the service and the associated identifier.

The term module may correspond equally to a software component and to a hardware component or a set of hardware and software components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

According to another hardware aspect, the invention also relates to a service gateway comprising a device for recording a service such as described above.

According to another hardware aspect, the invention also relates to a computer program able to be implemented in a method for recording a service such as defined above, the program comprising code instructions that, when the program is executed by a processor, performs the steps of the recording method.

This device for recording a service and this computer program have features and advantages analogous to those described above with reference to the method for recording a service.

According to yet another hardware aspect, the invention pertains to a recording medium able to be read by a data processor and on which there is recorded a program comprising program code instructions for executing the steps of the method defined above.

The invention will be better understood upon reading the following description, given by way of example and with reference to the appended drawings.

THE FIGURES

FIG. 1 shows the general context of one embodiment of the invention.

Figure 2:
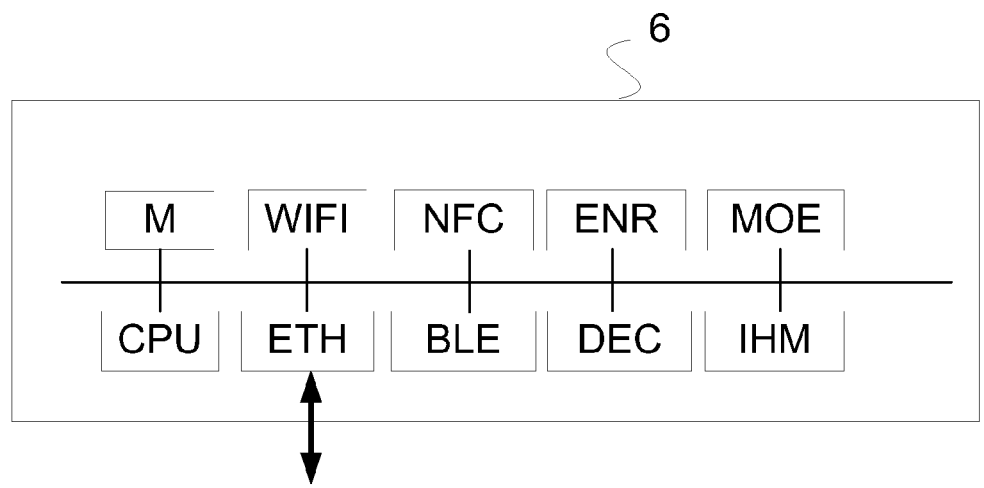

FIG. 2 schematically shows an architecture of a service gateway implementing one embodiment of the recording and the implementation of a service according to the invention.

Figure 3:
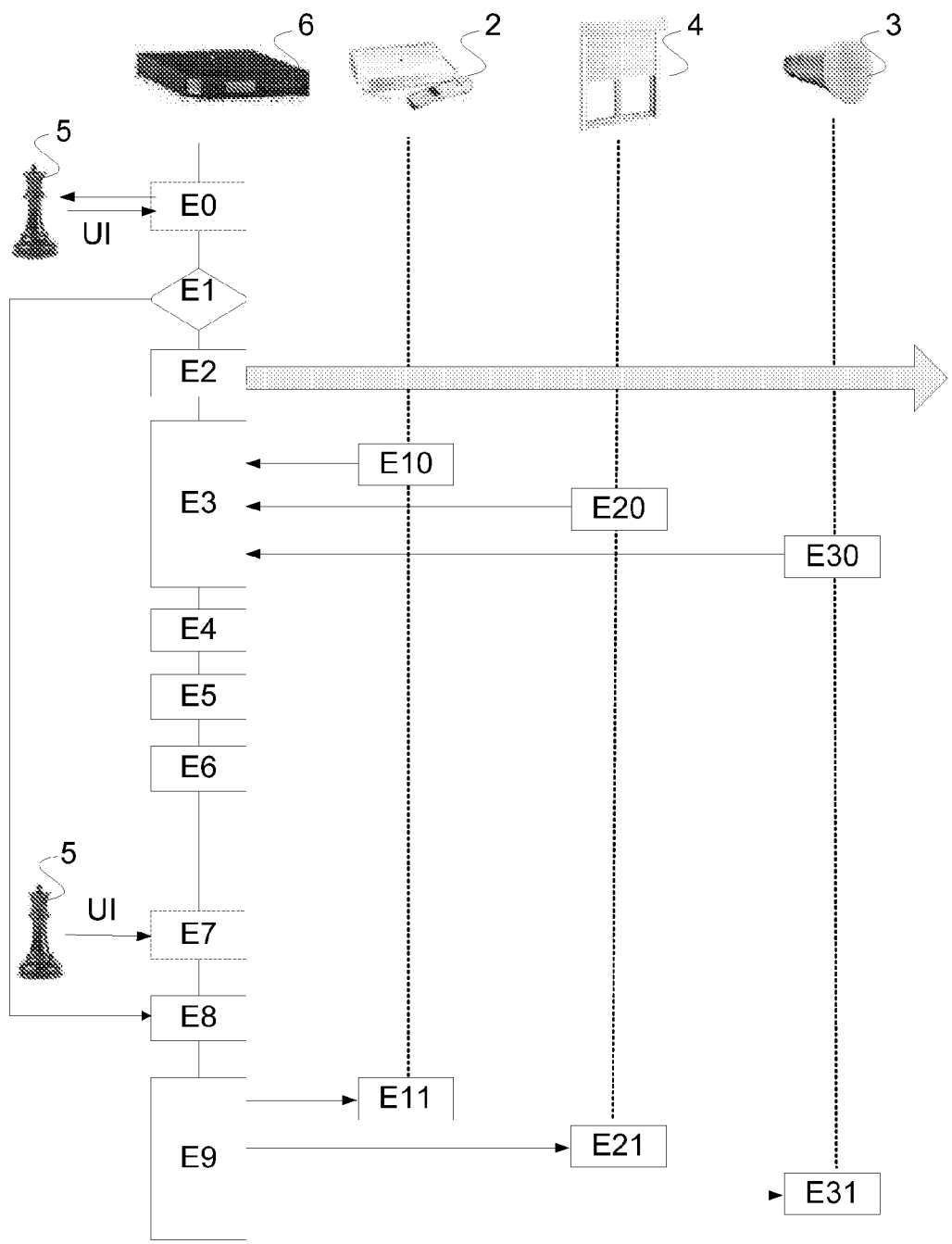

FIG. 3 shows, in the form of a flowchart, the recording and the implementation of a service according to one embodiment of the invention.

DETAILED DESCRIPTION OF ONE EXEMPLARY EMBODIMENT ILLUSTRATING THE INVENTION

FIG. 1 shows the general context of one embodiment of the invention.

The local area network (1) is for example an IP (Internet Protocol) local area network. The network (1) according to this example includes an element for managing the network (6) (a residential gateway, a home gateway, a hub, etc.), called "service gateway" hereinafter, and terminal devices (2, 3, 4) connected to this local area network and able to establish communications with one another. In this example, these are respectively a connected lightbulb (3), a digital decoder (2) and a connected electric blind (4).

These terminals are heterogeneous. They may in particular differ in terms of their operating system (Windows, Linux, Android, etc.), their type of connection to the network (Ethernet, Wifi, Bluetooth, BLE, etc.) and the actions of which they are capable (decoding an audiovisual program, positioning themselves on a TV channel, turning on, lowering, etc.).

Terminal device, or more simply terminal, is understood hereinafter to mean any device able to connect to and communicate on the local area network.

In the remainder of the description of this particular embodiment of the invention, consideration is given to the following service whose identifier is that of what is said to be a "contactless" tag (5) corresponding to the service, for example an NFC tag.

It is recalled that near field communications, usually called NFC, based primarily on the ISO (International Standard Organisation) 14443 standard, use wireless technologies so as to enable an exchange of information between two peripherals spaced apart by a short distance, typically less than ten centimeters. In this context, "tag reading" applications such as defined by the NFC Forum (industrial body responsible for promoting the implementation and standardization of NFC technology) define the establishment of what is called "contactless" communication between a master, in this case called reader, and a slave, in this case called tag. For example, the reader is situated on the service gateway and the tag is integrated into an NFC "token" (5) which serves as a carrier therefor and is additionally easy to recognize for the user. Establishing NFC communication makes it possible to read the information written into the tag, in particular its unique identifier (UID).

In the context of this embodiment, the NFC tag is associated with the service by way of a first presentation of the token to the NFC reader. The identifier of the token is read by the reader, which transmits it to the service gateway in this example. The gateway then displays an entry human-machine interface (HMI), for example a dashboard or a control application, such that the user enters the service that is of interest to him; when the user has finished describing his service, said service is recorded in association with the unique identifier of the token. Thereafter, when he wishes to execute the service, the user again presents the token to the NFC reader of the service gateway, such that a second reading of the unique identifier associated with the tag, and therefore now with the service, triggers the following events:

lowering the blind (action on the blind)
turning on the light in the dimmed setting (action on the light)
turning on the digital decoder and the television (action on the digital decoder and the television)
launching playback of an item of audiovisual content on the television (action on the digital decoder).

Moreover, according to one variant, the service consists of a set of sub-services, each sub-service additionally being associated with a sub-service number. One example of services and sub-services is illustrated in the table below:

TABLE 1 example of service and associated sub-services
123456789
Multimedia content viewing SERVICE

| Sub-service number | Actions |
|---|---|
| 1 | A. lower the blind 4<br>B. turn on the light 3 in the dimmed setting<br>C. turn on the digital decoder 2 and the television<br>D. launch playback of an item of audiovisual content on the television. |
| 2 | B2. Increase the brightness of the light 3 |
| 3 | A. Turn off the digital decoder 2 and the television<br>B. Turn off the light 3<br>C. Raise the blind 4 |

The service S having the identifier #123456789 consists of three sub-services numbered 1, 2, 3.

the first passage of the tag triggers recording of the service
a second passage of the tag triggers sub-service 1 described above
a third passage of the tag triggers sub-service number 2, which is manifested in an increase in the brightness of the lamp (from dimmed to medium)
a fourth passage of the tag triggers sub-service number 3, which corresponds to resetting the state of the devices of the network to what they were before the service was activated.

Naturally, this is just one exemplary use from among others. The user is thus relieved of manual action on each of the devices of the network. It is enough for him to present the NFC token to the reader for the service, or one of the sub-services, to be implemented.

A more complete algorithmic version will be detailed later on with reference to FIG. 3.

The invention thus offers a flexible, powerful and simple solution for recording and implementing a service in the local area network.

FIG. 2 schematically shows an architecture of a terminal implementing one embodiment of the recording and the implementation of a service according to the invention. This is preferably the service gateway (6).

The gateway (6) comprises, as is conventional, memories (M) associated with a processor (CPU). The memories may be ROM (from the English read only memory) or RAM (from the English random access memory) or else Flash memories. It communicates with the local area network via the Ethernet module (ETH), on the one hand, and possibly a module WIFI for wireless communication. It is also equipped with a Bluetooth Low Energy (BLE) module.

The gateway (6) furthermore comprises, according to the invention, the following modules:

a user interface module (IHM for human-machine interface) that makes it possible in particular for the user to acquire the description of the service; user interface is understood to mean all of the information and hardware and software mechanisms allowing a user to communicate with the device. It may indiscriminately be a keyboard, a graphical interface (for which the objects to be manipulated are presented in the form of pictograms on which the user is able to imitate physical manipulations), a Web interface (a graphical interface of a Web application manipulated using a Web browser), or else a voice interface, etc.
a software module DEC able to receive, and possibly request, in what is called a discovery step, the hardware and/or software capabilities of the terminals of the local area network by using one of the communication modules available to it: either the module WIFI, or the module ETH, or the module BLE, etc.
a module NFC allowing it to read the identifier of the service contained in the NFC tag.
a module ENR allowing it to record the description of the service (or of a set of sub-services) and the identifier of the service in association with its description.
a module MOE allowing it to implement the service by transmitting the requested commands to the appropriate terminals.

FIG. 3 shows, in the form of a flowchart, the recording and the implementation of a service according to one embodiment of the invention.

In this case, the service outlined with reference to the preceding figure is adopted again, that is to say: the user of the network (1) wishes to view a film on his television that is connected to the digital decoder (2) and, to this end, to close the roller shutter (4) and turn on a light (3) in order to benefit from optimum lighting conditions.

The overall implementation of the invention takes place in three separate phases:

a phase of discovering the terminals of the network and their capabilities;
a phase of recording the service or the sub-services associated with the service;
a subsequent phase of implementing the service on the various devices.

Phases of Discovering and Recording the Service

In a step E0, a first reading of the token and of the unique identifier (UI) contained inside the tag is performed by the NFC reader that is situated on the service gateway (6) in this example.

In a subsequent step E1, the identifier UI is tested. If this identifier is known to the gateway, that is to say if a service has already been associated with the unique identifier of the token, the immediately following steps of recording the service are not performed and step E1 will be followed by step E8.

Otherwise, if a new identifier is involved, step E1 is followed by a step E2, called "discovery" step. This step E2, initiated in this example by a request from the gateway on the local area network, is followed by a step E3 of receiving the features that the terminals (2, 4, 3) of the network declare during respective steps E10, E20, E30. According to one alternative, each of the terminals declares its capabilities spontaneously, for example when it first connects to the local area network, or when it is first powered up, when the various terminals do not yet know each other.

A terminal may transmit for example some or all of the following information:
  its identifier,
  its type (motion sensor, sun sensor, wind sensor, digital decoder, etc.),
  the name and the unit of a measured physical parameter,
  the minimum and maximum measured values,
  etc.

The capabilities may be transmitted for example in the form of a data structure (file, etc.) that is broadcast on the network during this discovery step. The data file may be transmitted as a whole or in several parts.

In addition, the gateway may know a device without the latter being explicitly visible on the network, in particular because it is powered off: for example, the gateway may know the digital decoder (because it has recorded it beforehand in its databases) and provide it in the list of the available devices even though it is absent at the time when the user wishes to record the service.

It will also be noted that the discovery steps (E2, E3, E10, E20, E30) may be situated before steps E0 and E1 of procuring the identifier.

These discovery phases may be implemented in a proprietary manner or comply, as already described, with a UPnP or BLE standard.

In a step E4, the user enters the service S, for example by using a human-machine interface of a smartphone or of a screen connected to the service gateway or else of his television. According to the exemplary service mentioned in FIG. 1 and in table 1, to provide the service S desired by the user, said user successively selects, via the HMI:
  the blind; action: lower the blind;
  the light; action: turn on in the dimmed setting;
  the digital decoder; action: turn on the digital decoder and the television if they are not turned on already;
  the digital decoder; action: launch decoding and then playback of an item of audiovisual content on the television.

Beforehand, for example following the discovery step, the various terminals and associated features may have been provided to the user so as to facilitate definition of the service.

In a step E5, the unique identifier is associated with the service. According to one variant, already discussed, a set of sub-services may be associated with the service (see table 1 above).

In a step E6, this association is recorded in a memory (for example of the service gateway).

Phase of Implementing the Service

In a step E7, identical to step E0, the user again presents his token to the NFC reader. The implementation of the service is separate from the recording thereof. Step E7 is therefore not linked in time to preceding step E6.

The reader procures the identifier of the tag and transmits it to the device of the gateway. As this is in this case the second (or subsequent) reading of the identifier, the device recognizes that the identifier is already associated with a service; in step E8, the description of the service is then procured from the identifier. For example, the unique identifier makes it possible to index a table in a memory, including the list of the actions to be implemented for the service, as presented previously.

In step E9, the service is implemented on the various terminals (2, 3, 4).

As a variant, as described previously (table 1), a third passage of the token may trigger an increase in the brightness of the light during steps E'7 of reading the identifier, identical to step E7 with the additional procurement of the passage number. As this is the third passage, sub-service number 2 is implemented. Step E'7 is followed by a step E'8 of procuring the description of the sub-service from the identifier and the passage number, and then a step E'9 of acting on the light so as to increase the brightness thereof.

As a variant, as described previously, a fourth and final passage of the token in front of the NFC reader may trigger actions that are the "reverse" of the actions of implementing the service according to steps E"7 of reading the identifier and analyzing the passage number (fourth and final passage, bringing about sub-service 3), E"8 of procuring the description of sub-service 3 from the identifier and the passage number, and E"9 of implementing the appropriate actions on the terminals so as to reset the network "as it was".

It goes without saying that the embodiment that has been described above has been given purely by way of indication and without any limitation, and that numerous modifications may easily be made by a person skilled in the art without otherwise departing from the scope of the invention.

Numerous other exemplary services may in particular be proposed:
  Turning on an Internet radio station and changing station (from among favorite stations) upon each tag passage;
  Turning on a light and changing color (from among favorite colors) upon each tag passage;
  Turning on a hi-fi system that operates in several rooms of the household, on a predefined playlist, and changing the room in which music is played upon each tag passage;
  etc.

The invention claimed is:

1. A method for recording a service in a local area network, the service comprising a set of actions to be performed on at least one communication terminal of the network capable of providing part of the service, the method including:
  procuring a unique identifier, the unique identifier corresponding to an identifier of a contactless tag;
  discovering the capabilities of terminals of the network;
  acquiring the capabilities of the discovered terminals;
  constructing the service in the form of a sequence of actions on at least one discovered terminal, by way of a user interface;
  associating the service with the unique identifier; and
  recording the service and the associated unique identifier, wherein subsequent procurement of the unique identifier associated with the service, subsequent to the initial procurement of the unique identifier, implements the service on at least one communication terminal of the local area network.

2. The method of claim 1, additionally comprising, after initially procuring the unique identifier, testing the association of the identifier with a service, wherein the constructing, associating, and recording the service are performed only if the identifier is not already associated with a service.

3. The method of claim 1, wherein the unique identifier is procured by reading a contactless tag.

4. The method of claim 1, the method further including:
procuring, subsequent to the initial procurement, a unique identifier of the service;
procuring the data of the service from the unique identifier; and
implementing the service on at least one terminal of the local area network.

5. The method of claim 4, wherein the procurement, subsequent to the initial procurement, of the identifier comprises reading a contactless tag.

6. The method of claim 1, wherein the service is associated with a set of sub-services, each sub-service being identified by a sub-service number in the set of sub-services, and wherein a new procurement, following the initial procurement, of the unique identifier of the service triggers the implementation of a sub-service identified by a sub-service number.

7. The method of claim 6, wherein the last sub-service associated with the service resets the terminals of the network to the state in which they were before the first sub-service was triggered.

8. The method of claim 1, wherein the discovery is followed by automatically acquiring software components necessary to enable an action on a discovered terminal.

9. A device for recording a service in a local area network, the service comprising a set of actions to be performed on at least one communication terminal of the network capable of providing part of the service, device comprising a processor, the device configured to:
procure a unique identifier, the unique identifier corresponding to an identifier of a contactless tag;
discover the capabilities of terminals of the network;
acquire the capabilities of the discovered terminals;
constructing the service in the form of a sequence of actions on at least one discovered terminal, by way of a user interface;
associate the service with the unique identifier; and
record the service and the associated identifier, wherein subsequent procurement of the unique identifier associated with the service, subsequent to the initial procurement of the unique identifier, implements the service on at least one communication terminal of the local area network.

10. A service gateway comprising the device of claim 9.

11. A non-transitory, computer-readable storage medium having stored thereon instructions which, when executed by a processor, cause the processor to implement the method of claim 1.

* * * * *